coil 80, the axis of which corresponds to the desired initial alignment of the spin axis 94. Usually, after a series of maneuvers over a period of time, the spin axis will be only slightly misaligned due to viscous drag on the surface of the float, so that the gyro does not return exactly to its initial alignment even though the system is returned to its exact starting point in inertial space. Such misalignments are normally very small compared to the alignment errors resulting from gimbal bearing friction in conventional gyros, and the errors themselves are predictable and easily compensated since there are no coulomb friction discontinuities and hysteresis. Therefore, assuming that this misalignment does not exceed 90° from the axis of the coil 80, shorting the coil windings, as shown in FIG. 11, by means of a simple switch 292, results in relatively large currents being induced in the windings by the flux from the rotating pole pieces 154 and 156. The current flow induced in the coil 80 produces a magnetic field through the coil that applies a restoring torque to the rotor 92 tending to align the plane of rotation of the pole pieces 154 and 156 with the plane of the coil, which represents the lowest energy condition of the system. Since the applied torquing force on the rotor 92 is directly towards the desired alignment, precession of the spin axis 94 is generally in a direction normal to the direct path for realignment so that the spin axis spirals inward until it reaches the desired alignment with the coil axis.

To achieve faster alignment, alternating currents might be applied to the coil in such a phase relationship that the float would be torqued by eddy currents in a shell 90 in the manner of an induction motor, the spin axis 94 to precess directly towards axis XX. Other means of obtaining float realignment might involve the use of pneumatic jets applied to the float surface at various points as necessary, based upon the known alignment of the spin axis.

What I claim is:

1. A gyroscope system comprising:
a body defining a spherical cavity;
a spherical, hollow float disposed within said cavity;
a gyroscope rotor within said float, journaled for rotation about a selected spin axis through the center of said float;
driving means contained within said float for rotating said rotor;
a support system including a relatively low viscosity flotation fluid having a density of approximately the same density as said float and completely surrounding said float within said cavity to maintain the outer surface of said float out of mechanical contact with said body;
energy radiating means carried for rotation at the periphery of said rotor, said float being permeable to the energy radiated; and,
sensing means attached to said body and responsive to the energy radiated from the rotor for generating output signals indicative of the orientation of said spin axis with respect to said body.

2. The gyroscope system of claim 1 wherein:
said energy radiating means consists of diametrically opposed magnetic pole pieces of opposite polarity for radiating a magnetic field from the periphery of said rotor, said float being of a nonmagnetic material; and,
said sensing means comprises three magnetic field sensing coils mounted within said cavity to encircle said float, each said coil lying substantially in a plane mutually orthogonal with respect to the planes of the other coils, and each said coil having a central axis extending perpendicular to the plane of said coil.

3. The gyroscope system of claim 2 wherein:
said flotation system further includes a plurality of hydrostatic bearing pads defining the interior of said cavity, each having a spherical bearing surface corresponding substantially to the quadrature spherical segment defined between the orthogonally arranged sensing coils.

4. The gyroscope system of claim 2 further comprising:
circuit means connected to receive said output signals from each of said sensing coils and responsive to the amplitude of said output signals for generating directional outputs indicative of the angular displacement of said spin axis of the float from each of said coil axes.

5. The gyroscope system of claim 2 further comprising:
circuit means connected to receive said output signals from each of said sensing coils for detecting the phase of each of said output signals and the relative phase sequence of the output signals from each of said sensing coils; and,
means responsive to the differences in phase and the detected phase sequence for providing directional outputs indicative of the angular displacement of said spin axis from each of said coil axes.

6. The gyroscope system of claim 2 further comprising:
circuit means connected to receive the output signals from each of said sensing coils and responsive to said output signals for generating directional outputs indicative of the angular displacement of said spin axis from each of said coil axes.

7. The gyroscope system of claim 1 wherein:
said driving means includes a direct current motor powered by battery means carried within said float.

8. The gyroscope system of claim 7 wherein:
said motor includes a generally cylindrical stator comprising a plurality of windings, said stator being mounted concentric of said spin axis;
a generally cylindrical, permanent magnet rotor having a central, concentric opening for receiving said stator, said rotor being journaled for rotation about said stator concentrically therewith; and,
an optical brush system comprising light source means disposed about said spin axis adjacent said rotor, a plurality of photocell means each associated with one of said stator windings and disposed about said spin axis to be selectively activated by said light source for providing current flow in a given direction through the associated armature winding, and optical shutter means carried by said rotor and interposed between said light source means and said photocell means for selectively activating each of said photocell circuits in synchronization with the rotation of said rotor.

9. The gyroscope system of claim 3 further comprising:
a source of electrical power external to said spherical cavity;
first and second conductive segments forming the spherical exterior surface of said float at opposite ends of said spin axis, each of said bearing pads having a conductive surface adjacent said float;
gating means responsive to said coil outputs for selectively providing electrical power from said source to the oppositely disposed pairs of said bearing pads having their conductive surface immediately adjacent said conductive segments on said float, said electrical power being transferred from the surface of said bearing pads to the conductive segments on said float; and, in which:
said rotor driving means includes a motor means and a power control circuit within said float connected to said conductive segments to supply the transferred electrical power to said motor.

10. The gyroscope system of claim 9 wherein:
said external source of electrical power is a high frequency alternating current source;
said motor in a direct current motor;
said power control circuit includes a rectifier circuit connected between said conductive segments to rectify the high frequency alternating current transferred from said bearing pads to provide direct current for driving said motor; and,
said flotation fluid is a nonconductive insulative liquid having good dielectric properties.

11. The gyroscope system of claim 9 wherein:
said external source of electrical power constitutes a high frequency alternating current source;
said motor is an alternating current motor operating at a relatively low frequency;

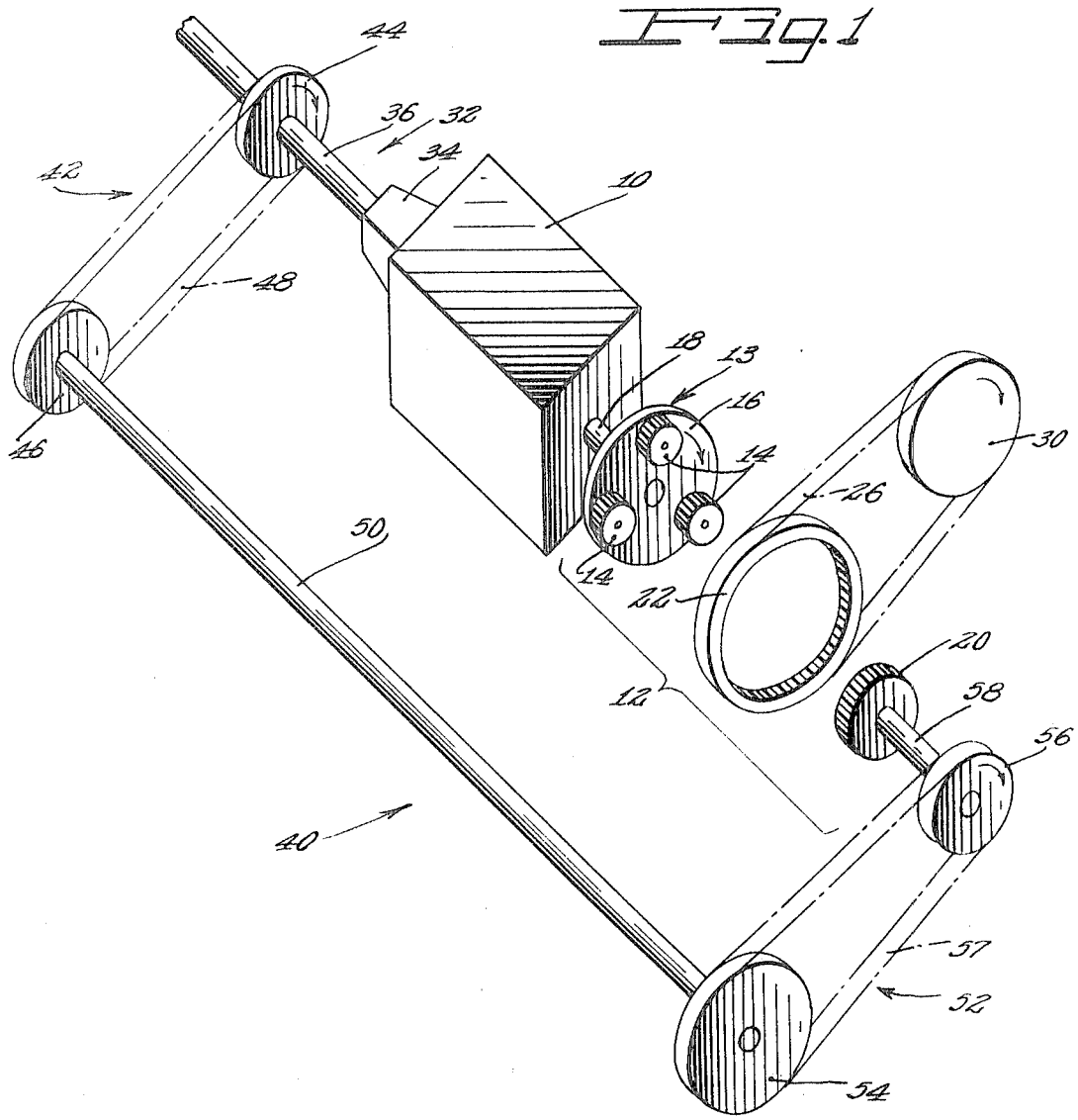

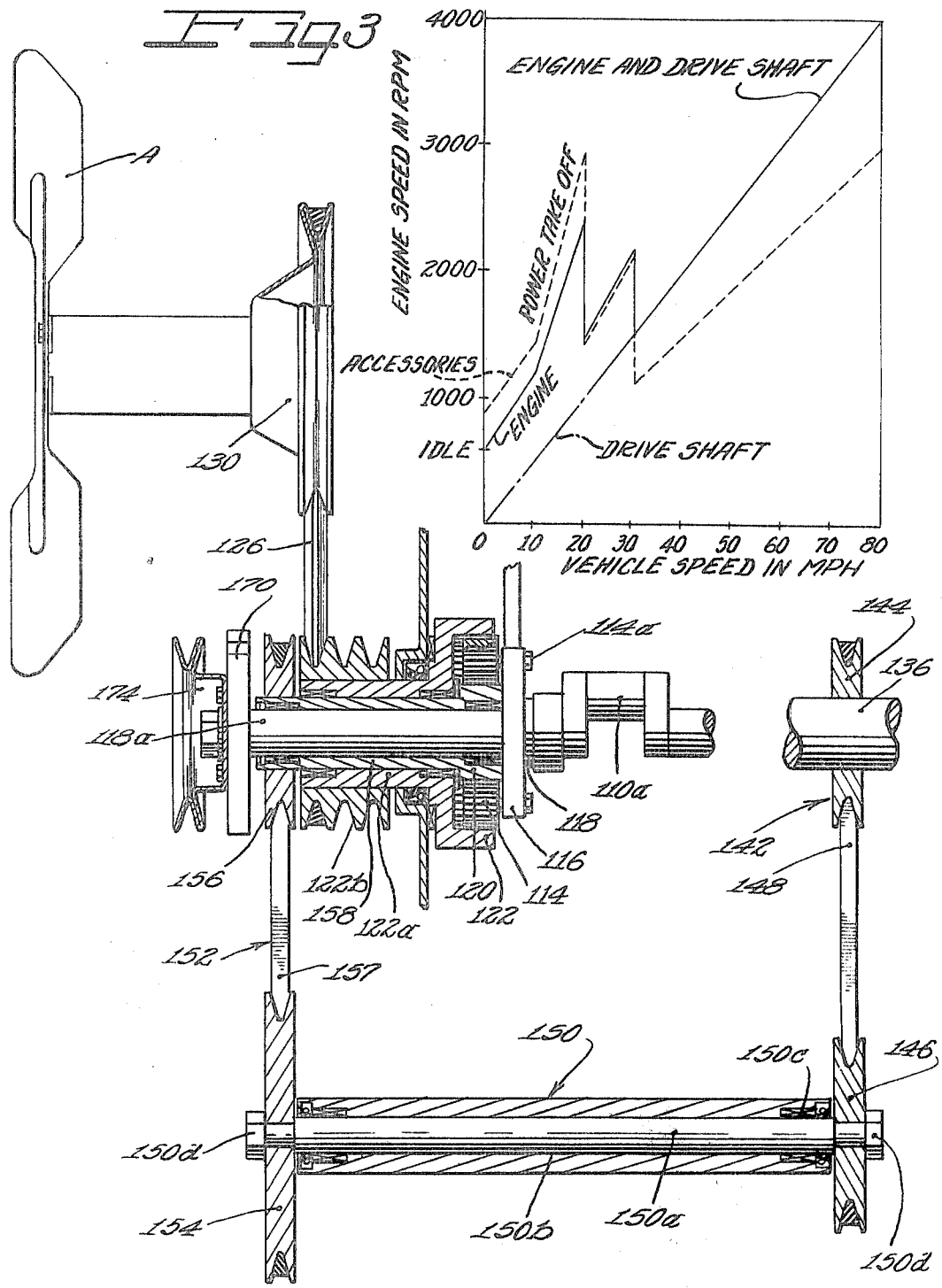

3,596,524

ENGINE ACCESSORY DRIVE SYSTEM

BACKGROUND OF THE INVENTION

This invention generally relates to a mechanism for power takeoff and more particularly contemplates an engine accessory drive system wherein power is taken off an engine or power source through a range of speed which is intermediate the range of speed of said engine or power source.

The common means for driving engine accessories and auxiliary means such as for example the air conditioning units and power steering pumps present on motor vehicles is by a direct belt-type drive from the engine to the accessory. This direct drive means imposes as wide a range of speed variation on the accessories as is encountered by the engine. In a motor vehicle, engine speeds vary from a low idle to high r.p.m. at full power. The engine speed, I have found, is often incompatible with the desirable speed and load characteristics of certain of the engine driven accessories, such as air conditioning for example. Thus, in stop-and-go urban traffic conditions during warm weather a maximum load is put on the air conditioner, yet at this critical point the capacity of the air conditioning unit is limited by the very low engine speed. By contrast, when the vehicle and engine are travelling at high expressway speeds and the air conditioner requirements are less, the high engine speed produces an over capacity of the cooling power which must be dumped or dissipated by periodic declutching or other control devices. Likewise, the power and speed requirements of other accessories such as the power steering and cooling fan are greatest at a time of low engine speed and are much less at high engine and vehicle speeds. The above noted incompatability of engine speed to the requirements of engine accessories has led others to overdesign and increase the capacities of the affected accessories to the point where they will perform adequately even at low idle speeds, however, this results in inefficient operation and extra expense and weight not only for the accessories but also for the supporting and driving structures.

SUMMARY OF THE INVENTION

The above noted problems of the prior art are overcome by my invention disclosed herein which provides an improved accessory drive system that increases the speed of the engine driven accessories during the periods of low engine revolutions per minute and decreases the speed of the engine driven accessories at high engine speeds. Thus, the range of speed of the accessory power takeoff is intermediate the range of speed of the engine or power source. An advantage of this improved accessory drive system is that accessories operating on this system can be sized and designed to operate over a smaller speed range and at speeds that are more compatible with their most efficient operation and maximum usefulness and durability.

The engine accessory drive system according to my invention comprises the combination of an engine or power source capable of transmitting rotary movement over a range of speeds interposed and connected between a first gear means and a second gear means wherein the engine power transmitted through the second gear means drives a second drive shaft means at a speed usually different from the engine speed. A first drive shaft means which may be directly connected to the engine thus taking the form of an extension of the engine crank shaft for example, is connected to a first element in the first gear means. The first gear means may take the form of a planetary gear wherein the first element includes the planet or pinion gears and their carrier, the second element includes the central or sun gear and the third element includes the ring or internal gear. By providing a power transmitting assembly connected between the second drive shaft means and the second element of the first gear means and by connecting the accessory power takeoff with the third element the revolutions per minute of the third element and hence the speed of the accessory power takeoff will be higher than the revolutions per minute of the engine when the engine is at idle in low gear and yet be lower when the engine is driving the vehicle at high gear speeds.

According to an advantageous embodiment of my invention the internal ring gear element rotates at a higher speed than the engine when the ratio of speed of the engine to the second drive shaft is greater than 1:1.5 and rotates slower than the engine when the ratio of speed of said power source to the second drive shaft is less than 1:1.5 if the first drive shaft is directly connected in a 1:1 ratio to the first element and the ratio of the outside diameter of the sun or central gear to the inside diameter of the internal or ring gear is 1:2 and the drive speed ratio of the sun gear to the second drive shaft speed is 1.5:1. From a plot of the revolutions per minute of the accessories with the miles per hour vehicle speed it may be seen that the accessory speed range is reduced, by the preferred embodiment disclosed, to one-half of the speed variation of the engine. From 0 to 20 m.p.h. the point where the vehicle transmission goes from low into intermediate gear, the accessories are driven by a speed increasing affect of the planetary gears. In the range of 20 to 30 miles per hour in intermediate gear, the accessories are driven at about the same speed as without the first planetary gear means, the planetary gears set forth giving a net 1:1 ratio of speed. At 30 miles per hour the transmission goes to high or direct drive, and the affect on the planetary gearing is to produce a speed reduction of approximately 25 percent. With automatic transmission having only two forward gear ratios the same effect of having a planetary gear reduction in direct drive and a planetary gear increase in accessory speed in low gear is achieved. In any case, with the vehicle stopped, the full planetary gear accessory speed increase is applied until the engine is speeded up so that the torque converter begins to turn the vehicle second drive shaft through the gears in the transmission. Therefore, it is obvious that whether a torque converter and an automatic transmission or a manual transmission and a clutch are used their action will produce the same desired reaction in the first gear means or planetary gears driving the accessories through a range of speed that is intermediate the range of engine speeds thereby allowing the accessories to be sized and designed to operate over a smaller speed range and at speeds that are more compatible with their most efficient operation and maximum usefulness and durability.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a schematic illustration of the concept of the present invention showing the first or planetary gear means exploded for purposes of clarity;

FIG. 2 is a cross-sectional elevational view of the present invention as applied to a typical vehicle power arrangement; and FIG. 3 is a plot of engine revolutions per minute to vehicle miles per hour showing the range of speed of the accessory drive pulley to the engine and drive shaft speeds through a typical transmission gear ratio.

DESCRIPTION OF THE PREFERRED EMBODIMENT

As schematically set forth in FIG. 1 my invention includes an engine or power source 10 which may be of a conventional internal combustion or diesel type. Attached to the engine 10 at what normally is its forward end in a motor vehicle is a first gear means generally indicated at 12 and shown in an exploded view. The first gear means 12 may be of a planetary type gear having a first element 13 which includes a plurality of pinion or planet gears 14 rotatably mounted on a carrier 16. The carrier 16 is affixed to a first drive shaft means 18 which may advantageously be an extension of the crankshaft of the engine 10. A second element 20 takes the form of a central or sun gear when the first gear means 12 is a planetary gear. The ring or internal gear for the planetary gear means 12 provides the third element 22 therefor. Suitable means such as a schematically illustrated belt 26 allows connection and cooperation of the accessory power takeoff means 30 with the third element 22. Arrows on the members 16 and 30 indicate their direction of rotation.

A second gear means generally indicated at 32 is provided on what will usually be the rear end of a conventional power source 10 and includes a conventional transmission means 34 which may be of a manual or automatic multispeed type. Connected to the transmission 34 is a second drive shaft means 36 which will usually turn at a speed in revolutions per minute that is different from the speed of the engine or power source 10, the first drive shaft means 18 and the affixed first element 13.

A power transmitting assembly generally indicated at 40 includes a first power transfer couple generally indicated at 42 which is shown in the form of a pulley member 44 attached to the second drive shaft means 36 and transmitting power in a 1:1 ratio to a similar sized pulley member 46 by means of a belt schematically indicated at 48. The assembly further includes a bypass shaft 50 having a first end attached to the pulley member 46 of the first power transfer couple 42 and a second end attached to a pulley member 54 of a second power transfer couple generally indicated at 52. In addition to the pulley member 54 the second power transfer couple 52 includes a pulley member 56 coupled to the second element 20 by means of a shaft 58. Again, a belt means schematically illustrated at 57 connects the pulleys 54 and 56. It is to be understood that the first and second power transfer couples 42, 52 are set forth by way of illustration only and that any equivalent means may be provided. The ratio of the pulley member 46 to the pulley member 54 is 1:1.5 while the ratio of the pulley members 54 to 56 is 1.5:1 so that the ratio of the member 56 and the second element 20 to the pulley members 44, 46 and the drive shaft 36 is 1.5:1.

The ratio of the inside diameter of the third element 22 to the second element 20 is 2:1 so that the pinion or planet gears 14 will be of a diameter that is one quarter of the inside diameter of the third element 22 and one-half of the diameter of the second element 20.

A typical application of the invention employing substantially the same ratios is set forth in FIG. 2 where the accessory being driven is a cooling fan A. The elements illustrated in FIG. 2 which correspond to those illustrated in FIG. 1 are prefixed with a "1" and their description may not be repeated unless they differ from the concepts set forth in FIG. 1.

Referring to the specific embodiment of the invention as set forth in FIG. 2 there is shown a crankshaft 110a which is rotated by a conventional power source not shown. Attached to what will usually be the forward end of the crankshaft 110a is a shaft 118 that is affixed to a carrier plate 116 upon which a plurality of pinion or planetary gears 114 are pivotally supported by pin means 114a. The carrier 116 and planetary gears 114 comprise the first element of the first gear means. The second element of the first gear means in the embodiment of FIG. 2 includes the central or sun gear 120 which has connected thereto a shaft 158 that in turn is affixed to pulley members 156.

An extension 118a of the shaft 118 extends through the hollow shaft 158 and may have affixed at its outer end a flywheel 170 which in turn may have a direct power takeoff pulley 174 affixed thereto. By this means accessories whose speed of operation is more compatible with the fluctuations in the speed of the engine drive shaft may also be powered.

In FIG. 2 the third element 122 which cooperates with the accessory power takeoff pulley 130, here shown by way of example to be connected to the engine fan blade assembly A, takes the form of a ring gear 122 having an integral forward extension 122a which has attached thereto one or more pulley accommodating means 122b. A belt 126 connects the pulley means 122b to the fan blade drive assembly pulley 130.

The sun gear 120 is driven as before by the power transmitting assembly which conveys rotational speeds from the output shaft 136 of the transmission or second gear means not shown and by means of a first power couple 142 comprised of the pulley, belt arrangement 144, 146 and 148 transmits this rotational force to a bypass shaft assembly 150 from whence it is conveyed to the second power transfer couple 152 which is comprised of the pulley, belt arrangement 154, 156 and 157. As shown, the shaft 150 includes an outer shaft 150b having bearing means 150c therein that allow rotation of an inner shaft 150a which is connected on opposite ends by connector means 150d to the respective pulleys 146, 154.

Operation of the accessory drive system according to my invention may best be understood by reference to the graph of FIG. 3 wherein the engine speed in revolutions per minute is plotted as the ordinate and the speed in miles per hour of a vehicle such as a conventional automobile is plotted as the abscissa. A straight line arithmetic increase in drive shaft speed through what would be a typical three speed transmission gear ratio has been assumed for purposes of illustration. Vehicle speed data has been plotted for values at 10 miles per hour increments and these have been connected with straight lines. The typical low gear ratio of 2.46:1 that extends over a range of from 0 to 20 miles per hour was chosen while the typical second or intermediate gear ratio of 1.46:1 was set for the speed range of 20 to 30 miles per hour and the standard high gear ratio of 1:1 was used for the speed range of 30 miles per hour and above. Engine and drive shaft revolutions of 4,000 per minute were taken to produce a vehicle speed of 80 miles per hour. The accessory power takeoff drive speed is plotted with dashed lines, while the engine speed is plotted as a solid line and the drive shaft speed has been plotted as a dash dot line.

Referring now to FIGS. 1 and 3 it may be seen that in low gear the engine and its directly connected shaft and first element 13 are rotating 2.46 times faster than the second drive shaft means 36, however, it may be seen that the power transmitting assembly 40 increases the revolutions per minute of the shaft 36 one and one-half times so that the second or sun gear element 20 rotates much slower than the first element 16 and in effect is relatively fixed so that the speed of the third or ring gear element 22 is substantially increased by the movement of the pinion gears 14 about the sun gear 20 in accordance with the well defined principles of planetary gears as will be understood by those skilled in the art. As shown, the gear elements are toothed, however, these teeth need not be set forth in detail because the number of teeth on the planet pinion 14 does not enter into the equations for speed ratio since the pinion engages both the sun and ring gears and therefore the teeth of all gears are the same size and the number of teeth of each gear is directly proportional to the gear diameter. Hence, the relative speeds will be the result of the difference in the gear diameters heretofore as set forth. For these particular gear ratios plotted it may be seen from FIG. 3 that at an idle speed of 600 revolutions per minute in first gear, a rotational speed of approximately 900 revolutions per minute will be produced in the third or accessory drive gear. It may be thus understood that with my invention an automobile idling in heavy standing traffic will produce an accessory power takeoff speed approximately 50 percent greater than would be possible with a direct takeoff from the first drive shaft means 18.

At 20 miles per hour in low gear the engine will be rotating at approximately 2,500 revolutions per minute while the accessory power takeoff will be rotating very nearly at 3,000 revolutions per minute. Upon a shift to the second gear ratio of 1.46:1 the engine and the first element 13 will be rotating one and one-half times faster than the drive shaft 36, however, as before, the power transmitting assembly 40 increases the rotation of the second gear means 34 output speed one and one-half times so that the second gear element 20 will rotate at practically the same speed as the first element 13 whereby the pinions 14 will be nearly stationary with respect to both the elements 20 and 22 so that all three elements of the first gear means 12 will rotate at about the same speed. Thus, during the engine speed range of approximately 1,460 to 2,200 revolutions per minute and the vehicle speed range of 20 to 30 miles per hour the accessory power takeoff will rotate at nearly the same speed as the engine. It should be noted that with the drive system of my invention the accessory power takeoff is rotating as fast at 10 miles per hour as it is at 20 miles per hour in the example set out herein.

In high gear with a gear ratio of 1:1 the engine speed and the speed of the first element 13 will be the same as the second drive shaft means 36, however, this latter speed will be increased one and one-half times by the power transmitting assembly 40 so that the second sun gear element 20 will be rotating faster than the first element 13 in which case the rotational speed of the third element 32 will be reduced by this difference in speed. Thus, once the vehicle is going 30 miles per hour the accessory power takeoff speeds will be substantially less than the engine and drive shaft speeds. According to FIG. 3 when the engine is turning at 1,500 revolutions per minute the accessories are being driven at approximately 1,100 revolutions per minute and this difference increases with the vehicle speed to the point where at an engine speed of 4,000 revolutions per minute at 80 miles per hour the accessory speed is only 3,000 revolutions per minute. This latter accessory speed is substantially the same speed as occurred in first gear at 20 miles per hour.

From the chart of FIG. 3 it may thus be seen that the speed range of the third element 22 and its cooperating accessory power takeoff according to my invention is from 900 to 3,000 revolutions per minute and hence in a ratio of 3.33:1 whereas for the accessory power takeoff without my invention the range is from 600 to 4,000 revolutions per minute or a ratio of 6.67:1 whereby it may be seen that with my invention there is only one-half of the speed variation of the accessories as was present according to the prior art. This intermediate range of accessory drive speeds allows the accessory to be sized and designed for much more efficient operation and maximum usefulness and durability.

Although minor modifications might be suggested by those versed in the art, it should be understood that I wish to embody within the scope of the patent warranted hereon all such modifications as reasonably and properly come within the scope of my contribution to the art.

I claim as my invention:

1. An engine accessory drive system comprising a power source interposed and connected between a first gear means and a second gear means, and a power transmitting assembly connected between said first and second gear means whereby an accessory power takeoff cooperating with said first gear means will have a range of speed intermediate the range of speeds of said power source.

2. An engine accessory drive system according to claim 1 wherein said second gear means includes a second drive shaft means, and wherein said second gear means is adapted to increase said second drive shaft speed in a direct line arithmetic progression while said power source speed varies over a range of speeds, said power transmitting assembly cooperating with said second drive shaft means to transmit power to said first gear means, said first gear means being adapted to transmit a higher speed than said power source when said power source is at low speed and being adapted to transmit a lower speed when said power source is at high speed.

3. An engine accessory drive shaft according to claim 2 wherein said first gear means includes a planetary gear arrangement having first, second and third elements and wherein said power source is directly connected to said first element through a first drive shaft of said first gear means and indirectly connected to said second element through said power transmitting assembly whereby said accessory power takeoff cooperates with said third element.

4. An engine accessory drive shaft according to claim 3 wherein said first element is a planet carrier, said second element is a sun gear and said third element is an internal gear.

5. An engine accessory drive shaft according to claim 2 wherein said power transmitting assembly includes a bypass shaft which is coupled at a first end to the said second drive shaft in a 1-1 relation and which is coupled at a second end to said first gear means.

6. An engine accessory drive system for reducing the range of speed of an accessory power takeoff as compared to the range of speed of a power source comprising a power source having a first and second drive shaft means connected therewith, said power source being capable of transmitting rotary movement over a range of speeds to said first and second drive shaft means, a first gear means including first, second and third elements, said first drive shaft means being connected between said power source and said first element of said first gear means, a second gear means interposed between said power source and said second drive shaft means whereby said first and second drive shaft means may rotate at different speeds for a single engine speed, an accessory power takeoff means cooperating with said third element of said first gear means, a power transmitting assembly connected between said second drive shaft means and said second element of said first gear means whereby the range of speed of said accessory takeoff is intermediate the range of speed of said engine.

7. An engine accessory drive shaft according to claim 6 wherein said first element of said first gear means is a planet gear carrier, said second element is a sun gear and said third element is an internal gear.

8. An engine accessory drive shaft according to claim 7 wherein said first drive shaft is directly connected in a 1:1 ratio to said first element wherein the ratio of the outside diameter of said sun gear to the inside diameter of said internal gear is 1:2, and wherein the drive speed ratio of said sun gear to said second drive shaft speed is 1.5:1 so that said internal gear third element rotates at a higher speed than said power source when the ratio of speed of said power source to said second drive shaft is greater than 1:1.5 and rotates slower than said power source when the ratio of speed of said power source to said second drive shaft is less than 1:1.5.